US011385124B2

(12) United States Patent
Donadoni et al.

(10) Patent No.: US 11,385,124 B2
(45) Date of Patent: Jul. 12, 2022

(54) DEVICE AND METHOD FOR DETECTING MICROLEAKAGES FROM KEGS AND SIMILAR CONTAINERS

(71) Applicants: CO.MAC. S.R.L., Bonate Sotto (IT); FT SYSTEM S.R.L., Alseno (IT)

(72) Inventors: Fabio Donadoni, Barzana (IT); Paolo Tondello, Alseno (IT)

(73) Assignees: CO.MAC. S.R.L., Bonate Sotto (IT); FT SYSTEM S.R.L., Alseno (IT)

(*) Notice: Subject to any disclaimer, the term of this patent is extended or adjusted under 35 U.S.C. 154(b) by 399 days.

(21) Appl. No.: 16/637,234

(22) PCT Filed: Aug. 2, 2018

(86) PCT No.: PCT/IT2018/050146
§ 371 (c)(1),
(2) Date: Feb. 6, 2020

(87) PCT Pub. No.: WO2019/043737
PCT Pub. Date: Mar. 7, 2019

(65) Prior Publication Data
US 2020/0232871 A1 Jul. 23, 2020

(30) Foreign Application Priority Data

Aug. 31, 2017 (IT) .................. 102017000097976

(51) Int. Cl.
*G01M 3/18* (2006.01)
*B67D 1/08* (2006.01)
*G01N 21/3504* (2014.01)

(52) U.S. Cl.
CPC .......... *G01M 3/184* (2013.01); *B67D 1/0801* (2013.01); *G01N 21/3504* (2013.01); *B67D 2001/0822* (2013.01)

(58) Field of Classification Search
CPC ........ G01M 3/184; G01M 3/047; G01M 3/00; G01M 3/224; G01M 3/226; G01M 3/38;
(Continued)

(56) References Cited

U.S. PATENT DOCUMENTS 5,473,161 A * 12/1995 Nix .................... G01N 21/3504
250/343
5,546,789 A * 8/1996 Balke .................. G01M 3/3281
73/40

(Continued)

FOREIGN PATENT DOCUMENTS

EP 0441632 A2 8/1991

OTHER PUBLICATIONS

International Search Report and Written Opinion for PCT/IT2018/050146, dated Feb. 18, 2019.

*Primary Examiner* — Lien M Ngo
(74) *Attorney, Agent, or Firm* — Merchant & Gould P.C.

(57) ABSTRACT

A device (1) for detecting microleakages from kegs (2) and similar containers containing a liquid with CO2 under pressure is provided with an outlet mouth (21) and a sealing valve (22). The device (1) includes a detection head (10) adapted to seal and couple with the keg (2) at the outlet mouth (21). The detection head (10) includes a measuring chamber (11) adapted to face over the outlet mouth (21). A light source (12) has an infrared component with wavelengths corresponding to CO2 absorption wavelengths facing the measuring chamber (11). A light sensor (13) faces the measuring chamber (11) for detecting the infrared light component with wavelengths corresponding to the CO2 absorption wavelengths emitted in the measuring chamber (11) by the light source (12). The measuring chamber (11) includes at least one air inlet (14) and at least one air vent (15).

10 Claims, 3 Drawing Sheets

(58) Field of Classification Search
CPC ................... G01M 3/02; B67D 1/0801; B67D 2001/0822; G01N 21/35; G01N 21/3504
USPC .............................. 99/275; 73/40, 49.2, 49.3
See application file for complete search history.

(56) References Cited

U.S. PATENT DOCUMENTS

| | | | |
|---|---|---|---|
| 5,614,718 A * | 3/1997 | Brace | G01N 21/3504 |
| | | | 250/339.09 |
| 6,189,369 B1 * | 2/2001 | Yokogi | G01M 3/229 |
| | | | 73/40.7 |
| 6,220,082 B1 | 4/2001 | Yamagishi | |
| 6,367,312 B1 * | 4/2002 | Yamagishi | G01M 3/184 |
| | | | 73/49.2 |
| 9,995,486 B2 * | 6/2018 | Young | G05D 16/2033 |
| 10,816,433 B2 * | 10/2020 | Kawano | G01M 3/3263 |
| 2012/0235038 A1 * | 9/2012 | Nishikawa | G01J 5/045 |
| | | | 250/338.3 |
| 2014/0253735 A1 * | 9/2014 | Fox | H04N 5/3651 |
| | | | 348/164 |
| 2014/0362226 A1 | 12/2014 | Xu et al. | |
| 2016/0069770 A1 | 3/2016 | Berger et al. | |

\* cited by examiner

DEVICE AND METHOD FOR DETECTING MICROLEAKAGES FROM KEGS AND SIMILAR CONTAINERS

This application is a National Stage Application of PCT/IT2018/050146, filed Aug. 2, 2018, which claims the benefit of Italian Patent Application No. 102017000097976, filed Aug. 31, 2017, and which applications are incorporated herein by reference. To the extent appropriate, a claim of priority is made to each of the above-disclosed applications.

TECHNICAL FIELD OF THE INVENTION

The present invention relates to a device for detecting microleakages from kegs and similar containers. More particularly, the present invention relates to a device for detecting CO2 microleakages from kegs and similar containers containing liquids with CO2 under pressure, for example beer and similar beverages. In a further aspect, the present invention also relates to a method for detecting microleakages from kegs and similar containers, in particular from kegs and similar containers containing liquids with CO2 under pressure, for example beer and similar beverages. The following description will mainly refer to beer-containing kegs. However, the present invention is of much broader applicability and can also be used to verify microleakages from kegs and similar containers filled with liquids—generally food liquids such as water, soft drinks and the like—pressurized with CO2.

STATE OF THE ART

It is known that one way of packaging and selling beer and similar beverages is by sealed kegs, generally made of stainless steel, plastic or aluminium, which have a mouth for loading and exiting the liquid. This mouth—once the keg has been filled—is kept closed by a sealing valve.

One of the main problems in the packaging and storage of kegs containing beer or other drinks under CO2 pressure is given by possible leakages that occur through the sealing valve which is positioned at the mouth of the keg.

On the one hand, these leakages lead to depressurization inside the keg with a decrease in the CO2 content and the occurrence of the so-called "flat" beverage conditions, on the other hand, the failure of tightness can lead to contamination of the beverage contained in the keg with microorganisms or other and/or the decay of the organoleptic properties of this beverage.

Large leakages through the valve result in the evident leakage of liquids and can therefore be easily detected, even visually, thus allowing to identify the kegs that leak immediately downstream of the filling process. These kegs can thus be removed from the production batch and subjected to checking/repairs and possibly discarded from the production batch.

Much more difficult, on the other hand, is the detection of microleakages, that is to say micro-losses of gas and/or of gas and liquid from the keg that are not immediately evident as they do not involve the evident leakage of liquids/foams, but that in the long term can compromise the quality of the product, both in terms of CO2 content ("flatness" of the drink) and of organoleptic qualities/contamination of the drink.

To solve the problem of detecting microleakages from beer kegs, various solutions have been proposed over time.

For example, patent application US2016/0069770 A1 proposes a method for testing the tightness of a container filled with beer in which a bell-shaped testing head is sealed to the mouth of the container, so that the mouth of the container faces a testing chamber inside the testing head. A pressure difference is then generated between the inside of the testing chamber and the internal pressure of the container—by applying vacuum or generating a depression in the testing chamber with respect to the internal pressure of the container—to check leakages of liquids or foams from the container inside the testing chamber. Said checking is carried out with the aid of a camera for the visual detection of the presence of foams or liquids in the measuring chamber or at the mouth of the container.

This method, while being feasible for detecting liquid leakages, is nevertheless complex and expensive, since it requires equipment for generating the vacuum as well as monitoring cameras. Further to this, said method is not able to detect CO2 microleakages from the container since it can detect only liquid materials and since any gas released from the container would be sucked by the equipment for generating the vacuum.

An alternative method for testing the tightness of a container filled with beer—based on electrical conductivity measurements—is proposed in U.S. Pat. No. 6,220,082 B2.

The device for detecting leakages from a container described in this patent is provided with an electrode for measuring the electrical conductivity of the liquid. The container on which the check must be carried out is brought to the measuring station by means of a conveyor and positioned upside down so that its mouth is inserted from above into a measuring chamber. By means of an actuator, the electrode for measuring the electrical conductivity, which is positioned on the bottom of the measuring chamber in an opposite position with respect to the mouth of the container, is inserted and extracted from the measuring chamber. To carry out the conductivity measurement, the measuring chamber is filled with water (which provides the conductivity reference), measuring any variations of this quantity due to the change in the composition of the liquid phase as a result of any leakages of beer (or other liquid) from the container.

This method is extremely complex and imprecise, and also requires a dedicated transport and handling system to transport and place the container upside down in the measuring station. Moreover, also in this case, the proposed method is not able to detect CO2 microleakages from the container, since it can operate only on liquid materials.

A further method for checking the tightness of kegs filled with beer has been proposed in the patent application EP 0441632 A2. This method is based on pressure measurements and involves the use of a detection device consisting of a detection head which is sealed tightly around the neck of the keg, defining a measuring cavity. Through a valve system, the measuring cavity is filled with water, causing the air to escape completely out of the cavity. Once the measuring cavity has been filled with water, the water inlet and air vent valves are closed. In this way any leakage of gas from the keg in the measuring cavity causes an increase in pressure in the cavity itself. The increase in pressure is detected by a pressure sensor which comprises a membrane with a side open to the fluid in the measuring cavity.

The method described in EP 0441632 A2, although being in theory also capable of detecting gas leakages from the beer keg, is actually complex and expensive and—especially if one wishes to detect microleakages of a relatively small amount—requires relatively long measurement times as the system must be given the necessary time so that in the measuring cavity it occurs an increase in pressure sufficient to be detected by the pressure sensor.

It would therefore be desirable to have a device and a method for detecting microleakages from kegs and similar containers which is able to overcome the problems associated with known devices and methods.

SUMMARY OF THE INVENTION

An object of the present invention is therefore providing a device and a method for detecting microleakages from kegs and similar containers, which allows $CO_2$ leakages to be detected from said kegs and containers, even in the absence of liquid and/or foam leakages.

A further object of the present invention is providing a device and a method for detecting microleakages from kegs and similar containers, which allows to detect even minimal leakages of $CO_2$ from said kegs and containers.

Another object of the present invention is providing a device and a method for detecting microleakages from kegs and similar containers, which does not require complex and expensive detection equipment.

A further object of the present invention is therefore providing a device and a method for detecting microleakages from kegs and similar containers, which does not require complex and expensive equipment for moving and handling said kegs and containers.

Still another object of the present invention is providing a device and a method for detecting microleakages from kegs and similar containers, which can be easily integrated into existing production lines.

Not least object of the present invention is providing a device and a method for detecting microleakages from kegs and similar containers, which is easy to implement and at competitive costs.

The aforementioned and other objects and advantages, as they will become apparent from the following description, are achieved by means of a device for detecting microleakages from kegs and similar containers containing a liquid with $CO_2$ under pressure and provided with an outlet mouth provided with a sealing valve; the device according to the present invention is characterized in that it comprises a detection head adapted to be coupled with sealing to said keg at said outlet mouth, said detection head comprising a measuring chamber adapted to face over said outlet mouth, a light source having an infrared component with wavelengths corresponding to $CO_2$ absorption wavelengths facing the measuring chamber, a light sensor facing said measuring chamber and capable of detecting said infrared light component with wavelengths corresponding to the $CO_2$ absorption wavelengths emitted in said measuring chamber by said light source; at least a first air inlet into said measuring chamber and at least one air vent from said measuring chamber.

In this way, it is provided a device for detecting microleakages from kegs and similar containers which satisfies the aforesaid objects.

In particular, thanks to the presence of a detection system comprising a light source with an infrared component having wavelengths corresponding to $CO_2$ absorption wavelengths and a detector capable of detecting said infrared light component with wavelengths corresponding to $CO_2$ absorption wavelengths, it is possible to determine the extent of absorption of one or more $CO_2$ characteristic wavelengths (for example, 4.26 µm, 2.7 µm, or about 13 µm) and to determine not only its presence but also its concentration, in particular its concentration in quantities exceeding a given threshold value.

In other words, contrary to the known devices described above, with the device for detecting microleakages from kegs and similar containers according to the present invention, it is possible to directly and specifically detect the presence and the quantity of $CO_2$ possibly leaking from the mouth of a keg or container, without resorting to the determination of leakages through indirect measurements such as pressure, electrical conductivity, or to visual type detections.

Under a practical point of view, the device for detecting microleakages of the present invention can be realized using a sensor (or more sensors) of $CO_2$, for example sensors of the NDIR type, to measure the possible attenuation at one or more of the $CO_2$ characteristic wavelengths (due precisely to the absorption at the characteristic wavelengths by the $CO_2$ possibly present) and thus determine its relative concentration.

Advantageously, the device for detecting microleakages from kegs and similar containers containing a liquid with $CO_2$ under pressure of the present invention can also be characterized in that it comprises sealing means between said device and said keg when said device is in an operative position at said outlet mouth of said keg; moreover, there can be advantageously provided means for moving said device between a non-operative position and an operative position coupled with sealing with said keg at said outlet mouth. The relative movement between the device for detecting microleakages and the keg can also be performed by moving the keg, while the device remains stationary, or by moving both the keg and the device for detecting microleakages.

According to a first preferred embodiment of a device for detecting microleakages from kegs and similar containers containing a liquid with $CO_2$ under pressure of the present invention, said first air inlet in said measuring chamber is a low-pressure air inlet. As better specified in the following detailed description, this low-pressure air inlet (slightly higher than the ambient pressure) can be advantageously used to clean the environment around the keg from $CO_2$, and in particular around the outlet mouth of said keg, and/or for the recirculation of air inside the measuring chamber during the performing of the measurement itself.

A second preferred embodiment of a device for detecting microleakages from kegs and similar containers containing a liquid with $CO_2$ under pressure according to the present invention, provides for the presence of a second air inlet in said measuring chamber. Said first air inlet in said measuring chamber is advantageously a low-pressure air inlet (slightly higher than the ambient pressure) for air recirculation within said measuring chamber, while said second air inlet in said measuring chamber is a high-pressure air inlet (and, in general, at higher pressure than the air entering from said first inlet) for washing said chamber.

In practice, through the second air inlet it can be introduced, into the measuring chamber, a flow of air for cleaning the $CO_2$ possibly stagnant in the measuring chamber and/or for drying the sensor after a possible washing (as better described in the following detailed description). Under a practical point of view, it is convenient that the $CO_2$ content in the washing air is substantially equal or close to the $CO_2$ content in the atmosphere of the working environment.

A further preferred embodiment of a device for detecting microleakages from kegs and similar containers containing a liquid with $CO_2$ under pressure according to the present invention, provides for the presence of a water and/or a washing liquid inlet in said measuring chamber according to methods better described below. In a particularly preferred embodiment of the device for detecting microleakages according to the present invention, the washing fluids inlet (high pressure air and/or water and/or washing liquid) can take place directly in the head or through an equipment manually mounted or automatically connected to the head itself.

In general, a device for detecting microleakages from kegs and similar containers containing a liquid with $CO_2$ under pressure according to the present invention advantageously comprises control means adapted to receive input signals from said light sensor, said signals being representative of the amount of light with infrared component with wavelengths corresponding to $CO_2$ absorption wavelengths absorbed during a microleakage detection cycle.

In a further aspect thereof, the present invention also relates to a method for detecting microleakages from kegs and similar containers containing a liquid with $CO_2$ under pressure, said kegs/containers being provided with an outlet mouth provided with a sealing valve.

The method for detecting microleakages according to the present invention is characterized in that it comprises the following steps:

i) positioning said keg in a measuring position at a detection device according to the present invention in its various embodiments, said detection device being in a non-operative position and spaced apart from said keg;

ii) starting the approach of said detection device to the outlet mouth of said keg from said non-operative position to an operative position coupled with sealing with said keg;

iii) coupling with sealing said detection device in said operative position on said outlet mouth of said keg;

iv) acquiring through said light sensor one or more measurements relative to said infrared light component having wavelengths corresponding to $CO_2$ absorption wavelengths;

v) compare said one or more measurements relative to said infrared light component having wavelengths corresponding to $CO_2$ absorption wavelengths with a first pre-set threshold value and determining whether said keg is subjected to microleakages on the basis of said comparison;

vi) removing said detection device from said keg by bringing it from said operative position to said non-operative position;

said comparison step v) being carried out before, during or after said step vi) of removing said detection device from said keg.

In practice, in step iv) it is measured the extent of absorption at one or more $CO_2$ characteristic wavelengths (for example, 4.26 µm, 2.7 µm, or about 13 µm) and it is determined the possible presence and relative concentration of $CO_2$. In step v) it is verified whether the concentration is higher than a first pre-set threshold value—and consequently it is determined whether the keg on which the measurement has been carried out is subjected to $CO_2$ microleakages—said processing can be carried out before or after the detection device has been removed from the outlet mouth of the keg.

The $CO_2$ value used in the comparison with the threshold value in step v) can be a value directly acquired in step iv) or the result of processing performed on one or more values acquired during said step iv) and/or in previous or subsequent steps (for example in order to take into account background values of $CO_2$ present in the atmosphere).

The approaching and removing step of the detection device from the keg can take place by moving the device, while the keg remains stationary, or by moving the keg, while the device remains stationary, or by moving both the keg and the device for detecting microleakages.

In a preferred embodiment of the method for detecting microleakages from kegs and similar containers according to the present invention, during said approaching step ii) of said detection device to the outlet mouth of said keg (2), the light sensor acquires at predetermined time intervals measurements of said infrared light component having wavelengths corresponding to $CO_2$ absorption wavelengths.

In practice, in this embodiment of the detecting method of the present invention, the $CO_2$ measurement starts before the detection device reaches the operative position, in order to acquire $CO_2$ values which are representative of the $CO_2$ concentration in the atmosphere, to possibly correct and/or compensate for the values measured by the detection device when it is in operative position on the mouth of the keg.

As previously said, in a preferred embodiment of the method for detecting microleakages from kegs and similar containers, according to the present invention, during said approaching step ii) of said detection device to the outlet mouth of said keg, low-pressure air is recirculated in said measuring chamber entering from said first air inlet into said measuring chamber and leaving said measuring chamber from said at least one air vent. In this way, the environment around the keg—and in particular around its outlet mouth—is cleaned of possibly stagnant $CO_2$. Furthermore, during at least a few initial moments of said acquisition step iv) by said light sensor of the measurements relative to the infrared light component typical of the $CO_2$ absorption wavelengths, low-pressure air is advantageously and preferably recirculated in said measuring chamber by entering it from said first air inlet into said measuring chamber, and by exiting it from said at least one air vent from said chamber in order to force any $CO_2$ microleakage in the area between said light source and said light sensor.

In a further embodiment of the method for detecting microleakages from kegs and similar containers according to the present invention, the detection of $CO_2$ can remain active even when the detection device is not in the operative position, that is to say during the approaching step to the keg and/or during the removing step from the keg and/or in the non-operative position when raised with respect to the keg. In this way it is possible to detect parameters relative to the concentration of $CO_2$ in the environment and/or verify that inside the measuring chamber there is not a too high concentration of $CO_2$.

In this case, when said detection device is in said non-operative position, the method for detecting microleakages according to the invention can advantageously comprise also a step of acquiring one or more measurements of said infrared light component having wavelengths corresponding to $CO_2$ absorption wavelengths and a comparison step of said measurements relating to said infrared light component with a second pre-set threshold value. If one or more measurements relating to said infrared light component with wavelengths corresponding to $CO_2$ absorption wavelengths in said non-operative position of said detection device is greater than said second pre-set threshold value, the method according to the invention can comprise a washing step of said chamber and of said sensor with high-pressure air entering in said measuring chamber from a second air inlet.

Alternatively, or in addition to the air washing steps described above, the method for detecting microleakages according to the invention can advantageously comprise also a step of acquiring one or more measurements of said light and a comparison step of said measurements relating to said light with a third pre-set threshold value. If one or more measurements relating to said light in said non-operative position of said detection device is greater than said third pre-set threshold value, the method according to the invention can comprise a washing step with air and/or water and/or a washing liquid of said measuring chamber and/or of said sensor.

This can be useful since, during the acquisition step, the sensor could become dirty due to excessive releases of foam and/or liquids from the outlet mouth of the keg, thus reducing the received light level. In this case, if the light level is too low (opacified sensor), the measurement cycle is stopped and it is started the water and/or the washing liquid cleaning cycle in order to restore the initial standard conditions of the system light source/sensor.

At this washing step with water and/or with a washing liquid, a high-pressure air washing step may be followed, as previously described for drying the measuring chamber and/or the system light source/light sensor.

As previously mentioned, the washing fluids inlet (high pressure air and/or water and/or washing liquid) can take place directly in the head or through an equipment manually mounted or automatically connected to the head itself.

BRIEF DESCRIPTION OF THE FIGURES

Further features and advantages of the present invention will become clearer from the description of the preferred embodiments, illustrated by way of non-limiting example in the accompanying Figures, in which.

DETAILED DESCRIPTION OF SOME EMBODIMENTS OF THE INVENTION

With reference to the accompanying figures, a device for detecting microleakages from kegs and similar containers containing a liquid with CO2 under pressure is designated by the reference number 1.

Figure 1:
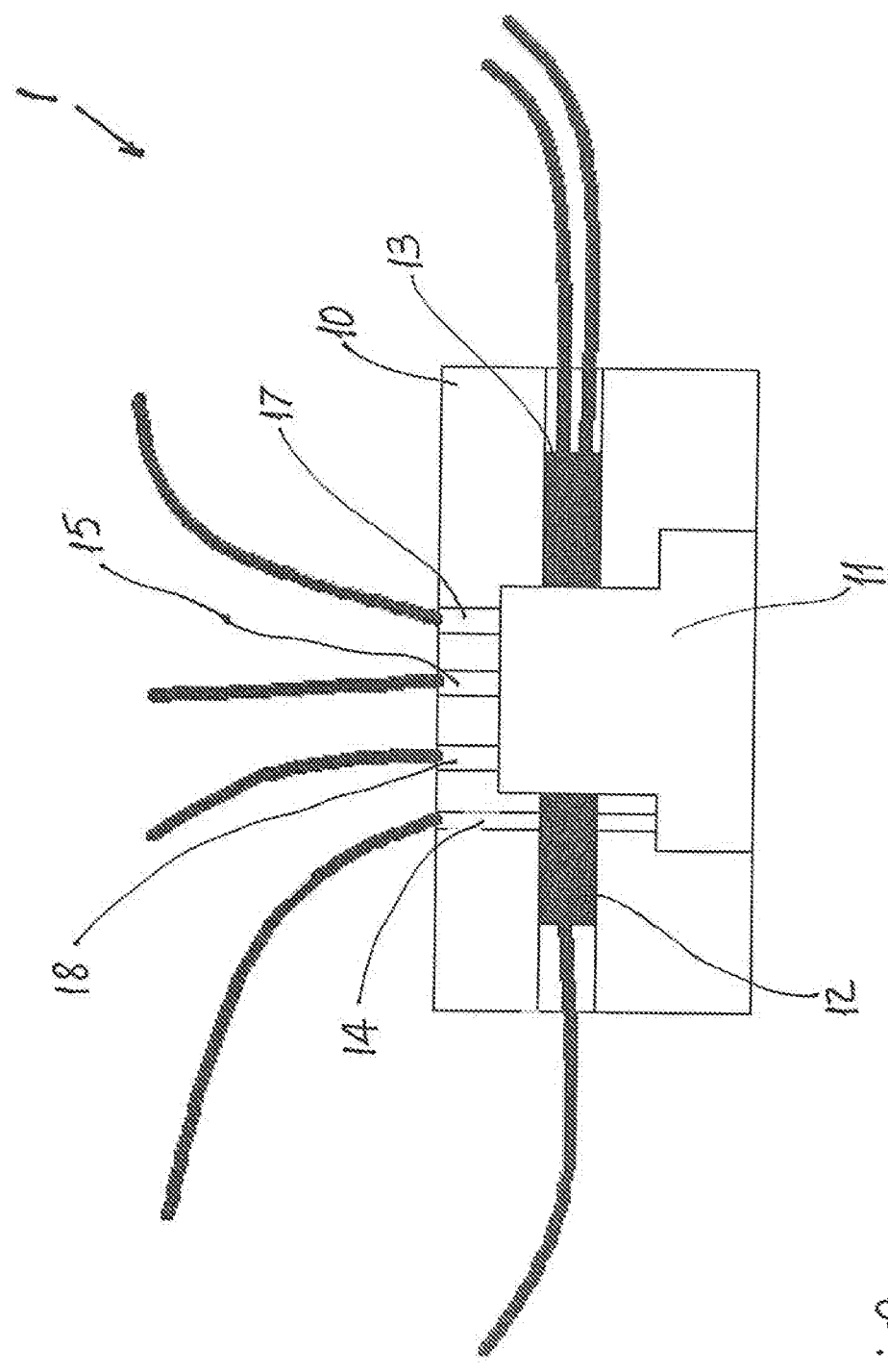
FIG. 1 is a schematic view of an embodiment of a device for detecting microleakages from kegs and similar containers containing a liquid with CO2 under pressure, according to the present invention.
Figure 2:
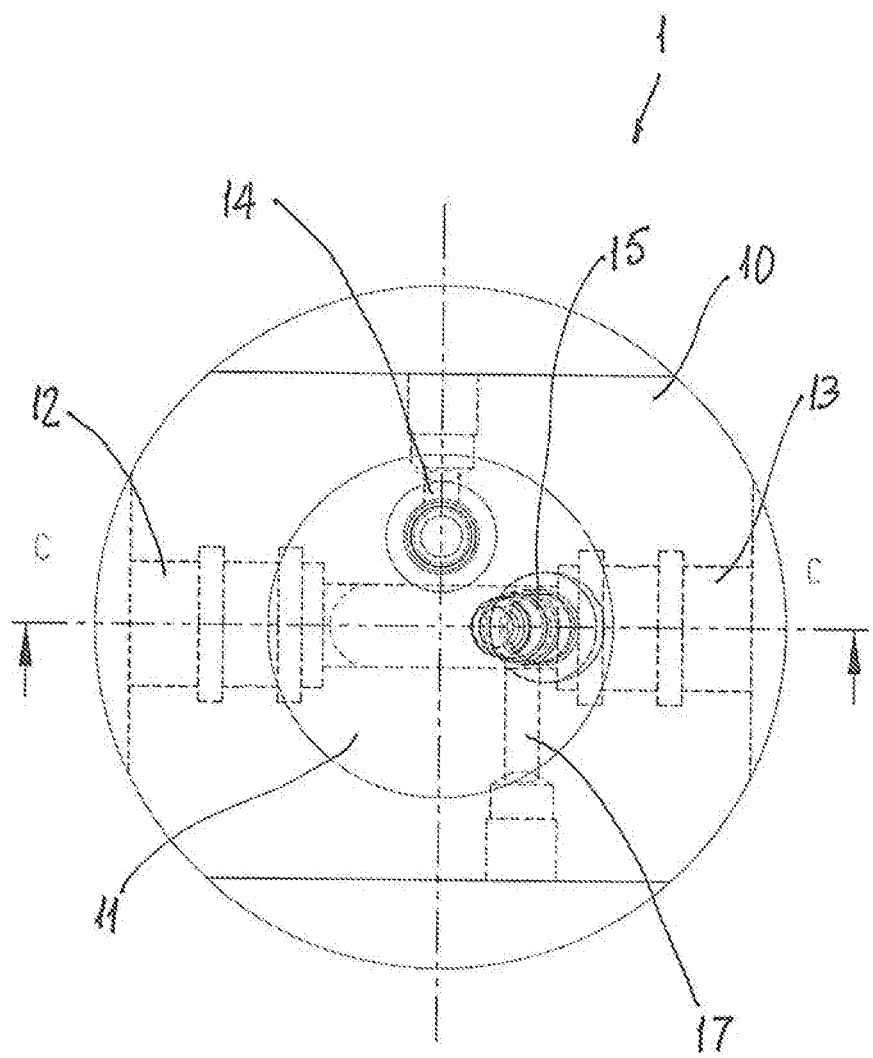
FIG. 2 is a plan view of an embodiment of a device for detecting microleakages from kegs and similar containers containing a liquid with CO2 under pressure, according to the present invention.
Figure 3:
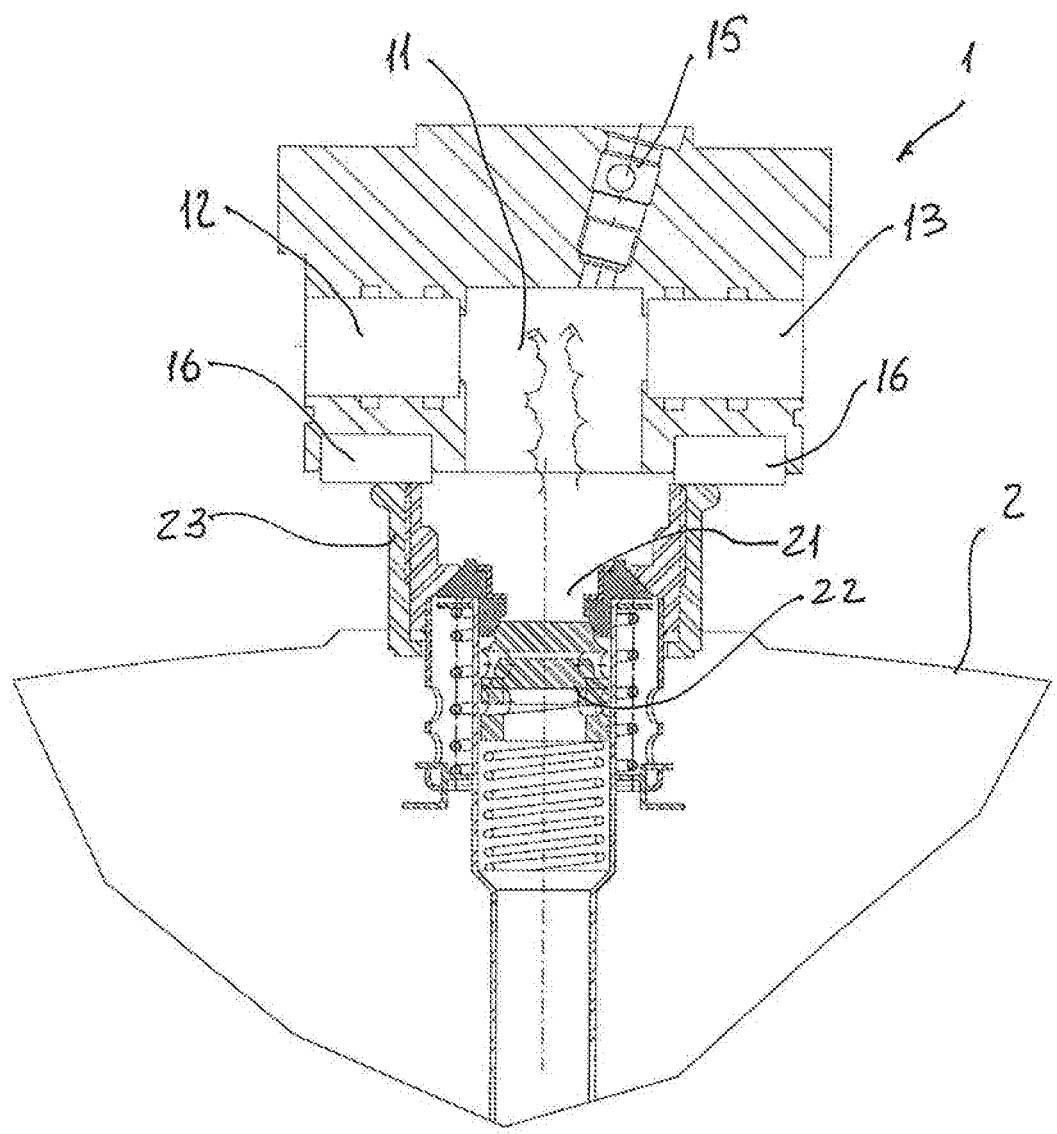
FIG. 3 is a sectional view of the embodiment of the device for detecting microleakages, according to the present invention, shown in FIG. 2 along the plane C-C.

With reference to FIG. 3, the detection device 1 according to the invention is adapted to operate on kegs 2 and similar containers generally provided with an outlet mouth 21 which is usually surrounded by a neck 23 and provided with a sealing valve 22. Typical examples are beer kegs made of stainless steel, plastic or aluminum and of various capacities. These kegs are widely known and will not be further described in detail.

The device 1 for detecting microleakages of the present invention comprises, in its more general embodiment, a detection head 10 adapted to be coupled with sealing to said keg 2 at said outlet mouth 21.

With reference to FIG. 3, in order to ensure the seal between the detection device 1 and the keg 2 when the device 1 is in an operative position at said outlet mouth 21 of said keg 2, said detection device can be advantageously provided with sealing means 16 between said device 1 and said keg 2. In the embodiment of FIG. 3, said sealing means consist of a gasket 16 which, in the operative position of the device 1, is resting on the neck 23 placed around the outlet mouth 22 of the keg 2.

One of the peculiar features of the detection device 1 according to the invention is given by the fact that said detection head 10 comprises a measuring chamber 11. As can be seen from FIG. 3, said measuring chamber 11—when the device is in operative position at the outlet mouth 22 of the keg 2—faces onto said outlet mouth 21 of said keg 2. In this way, possible CO2 microleakages from the keg can easily enter in the measuring chamber 11 where the quantitative detection of such possible CO2 microleakages occurs.

For this purpose, the detection device 1 according to the invention is conveniently provided with at least one light source 12 which faces said measuring chamber 11 and which has an infrared component with wavelengths corresponding to typical CO2 absorption wavelengths (for example, 4.26 μm, 2.7 μm, or about 13 μm).

The detection device 1 according to the invention is then conveniently provided with at least one light sensor 13 which faces said measuring chamber 11 and which is adapted to detect the infrared light component with wavelengths corresponding to CO2 absorption wavelengths emitted inside the measuring chamber 11 by said light source 12. From the measurement of the amount of light absorbed at the specific CO2 absorption wavelengths it is then possible, according to known principles, to determine the concentration of CO2 in the environment under measurement.

In practice, the system consisting of the light source 12 and the light sensor 13 can be substantially constituted by one or more conventional CO2 sensors which measure the attenuation at one or more of the CO2 characteristic wavelengths and determine the respective CO2 concentration.

For this purpose, the device 1 for detecting microleakages from kegs 2 and similar containers, according to the present invention, also advantageously comprises control means (not shown in the accompanying figures) adapted to receive input signals from said light sensor 13 representative of the amount of light with infrared component with wavelengths corresponding to CO2 absorption wavelengths absorbed during a microleakage detection cycle, and which are therefore representative of the concentration of CO2 present in the measurement environment.

As better described in the following, the comparison between said values with appropriate threshold values therefore allows to determine whether the keg is subject to microleakages of unacceptable extent and to allow to intervene accordingly.

The device 1 for detecting microleakages from kegs 2 and similar containers, according to the present invention, further comprises at least a first air inlet 14 in said measuring chamber 11 and at least one air vent 15 from said measuring chamber 11, whose functionality will be better described below.

The movement of the detection device 1, according to the present invention, between said non-operative position and the operative position coupled with sealing with said keg 2 at its outlet mouth 21 can conveniently be carried out by movement means (not shown in figures), for example electric actuators, such as an electric motor, or hydraulic or pneumatic actuators, such as a piston or similar devices.

In a preferred embodiment of the device 1 for detecting microleakages according to the present invention, the first air inlet 14 in said measuring chamber 11 is a low-pressure air inlet. For the purposes of the present invention, the term low pressure means a pressure slightly higher than the atmospheric pressure and such as to allow a constant flow of air, for purposes which will be better described below. In the embodiments of the detection device 1 of the present invention illustrated in the accompanying figures, said device 1 also comprises a second air inlet 17 in said measuring chamber 11. In these embodiments, said first air inlet 14 in said measuring chamber 11 is a low-pressure air inlet for recirculating air into the measuring chamber 11, while said second air inlet 17 in said measuring chamber 11 is a high-pressure air inlet for washing said chamber 11.

For the purposes of the present invention, the term low-pressure means a pressure slightly higher than the atmospheric pressure and sufficient to guarantee an air mixing inside the measuring chamber 11, while the term high-pressure means a pressure higher than the previous one and such as to guarantee an air wash inside the measuring chamber 11.

Conveniently, the CO2 content in the washing air is substantially equal or close to the CO2 content in the atmosphere of the working environment.

Still with reference to the accompanying figures, a further particular embodiment of the device 1 for detecting microleakages from kegs 2 and similar containers according to the present invention, also provides for the presence of a water and/or a washing liquid inlet 18 in said measuring chamber 11, with operative functionalities better described in the following. In a particularly preferred embodiment of the device for detecting microleakages according to the present invention, the washing fluid inlet can take place directly in the detection head or through an equipment manually mounted or automatically connected to the detection head itself.

In the more general embodiment of a method for detecting microleakages from kegs 2 and similar containers containing a liquid with CO2 under pressure, according to the present invention, the operating steps are the following.

From the production line, a keg 2—filled for example with beer—enters the measuring station and rests on special stops, at a detection device 1 as previously described. In this step, said detection device 1 is in a non-operative position and is spaced from said keg 2.

At this point a descending command is sent to the actuator means, for example to a piston which commands the descending and the rising of the detection device 1, and it is started the approaching of said detection device 1 to the outlet mouth 21 of said keg 2, bringing the device 1 from said non-operative position to an operative position coupled with sealing to said keg 2.

In a preferred embodiment of the method for detecting microleakages according to the present invention, during said approaching step of the detection device 1 to the outlet mouth 21 of the keg 2, it is recirculated in said measuring chamber 11 low-pressure air which enters into said measuring chamber 11 from said first air inlet 14 and exits said measuring chamber 11 through at least one air vent 15. Furthermore, during this descending step, it is advantageously possible to start at predetermined time intervals the acquisition by said light sensor 13 of one or more measurements relative to said infrared light component with wavelengths corresponding to CO2 absorption wavelengths emitted by said light source 12.

In practice, according to this embodiment, after it is initiated the descending of the detection device 1 towards the outlet mouth 21 of the keg 2, the control means send a measuring start signal to the light sensor 13. From this instant the sensor 13 starts to save the measurements gradually acquired at regular time intervals, for example a few hundred milliseconds, typically between 300 and 500 ms. These measurements can be useful, among other things, for a calibration of the detection device 1 that takes into account the amount of CO2 commonly present in the surrounding atmosphere.

Moreover, still during this descending step of the detection device 1 towards the outlet mouth 21 of the keg 2, the control means send an opening signal to the control valves of the first air inlet 14 and of the air vent 15, to allow a recirculation of low-pressure air in order to clean the environment around the keg 2 from CO2 and in particular in the area of the outlet mouth 21 of the keg 2.

Once the descending step of the detection device 1 has been completed, it reaches its operative position and leans on the outlet mouth 21 of said keg 2. At this point it is possible to start the acquisition by said light sensor 13 of one or more measurements, relative to said infrared light component with wavelengths corresponding to CO2 absorption wavelengths emitted by light source 12, which are indicative of possible microleakages from said keg 2.

In operative position, during at least a few initial instants of said acquisition step in operative position by means of said light sensor 13 it may be convenient to recirculate low pressure air into said measuring chamber 11 making it enter from said first air inlet 14 into said measuring chamber 11 and making it exit from said chamber 11 through said at least one air vent 15, to efficiently direct the possible CO2 microleakages in the area of the measuring chamber 11 between said light source 12 and said light sensor 13.

For example, a typical measuring cycle provides that the descending of the detection device 1 lasts about one second and, during this period, low-pressure air is recirculated and measurements are started using the light sensor 13.

When the detection device 1 reaches the operative position, the flow of low-pressure air is conveniently interrupted, while continuing to acquire measurements using the light sensor 13.

After a short initial period of acquisition of possible microleakages, it is convenient to recirculate low-pressure air for a very short period of time, to homogenise the internal environment and efficiently direct possible CO2 microleakages into the measurement area. In this initial phase, therefore, the air inlet 14 and the air vent 15 are reopened for a very short period, for example 50 ms.

Typically, the measurement cycle lasts a few seconds, for example from 3 to 5 seconds, and normally about 4 seconds, at the end of which it is possible to remove said detection device 1 from said keg 2 moving it from said operative position to said non-operative position.

During this time, it is possible to acquire a sufficient number of measurements, for example about 10 measurements, which—subjected to appropriate processing that may take into account also CO2 background values recorded in free atmosphere—provide a final measurement result indicative of the CO2 possibly leaking from said keg 2.

The final result is obtained by making the difference between the maximum value and the minimum value of the measurements (first the minimum value is calculated, and then the maximum value is calculated between all and only the measurements taken before the measurement with the minimum value). Greater the value of the final result, higher the value of CO2 leaking from the keg.

By means of a control system the final result is then compared with a first pre-set threshold value which determines the acceptable limit of microleakages and which allows to establish if said keg 2 is actually subject to CO2 microleakages.

The time parameters of the various operations carried out during a measurement cycle previously reported (descending/rising of the detection device, opening/closing of the low-pressure air inlet/outlet valves from the measuring chamber, number and acquisition frequency of the measurements) are purely by way of example and can be varied according to the requirements.

Moreover, the comparison step between the final result of the acquired measurements with the first pre-set threshold value can be performed before, during or after the removing step of said detection device 1 from said keg 2.

In addition to the measurement cycle described above, the method for detecting microleakages from kegs 2 and similar containers containing a liquid with $CO_2$ under pressure, according to the present invention, can also provide at least two other independent cycles which are useful for the proper functioning of the detection device 1 of the present invention.

In particular, in a first specific embodiment of the method for detecting microleakages from kegs 2 and similar containers of the present invention, it is possible to provide a step of acquisition of one or more measurements relative to said infrared component of light with wavelengths corresponding to $CO_2$ absorption wavelengths emitted from said light source 12 even when said detection device 1 is in a non-operative position, i.e. when it is detached and raised with respect to the keg.

The measurement (or measurements) thus acquired is then compared with a second pre-set threshold value which is substantially representative of a background $CO_2$ value which can be considered acceptable.

If said one or more measurements related to said infrared light component with wavelengths corresponding to $CO_2$ absorption wavelengths in said non-operative position of said detection device 1 are higher than said second pre-set threshold value, it is conveniently provided a washing step of said measuring chamber 11 and of said light sensor 13 with high pressure air which enters said measuring chamber 11 from a second air inlet 17.

The acceptable $CO_2$ value in the non-operative position of the detection device 1 can be varied and set according to the requirements and operative conditions. Moreover, normally, the washing step of the measuring chamber 11 and of the light sensor 13 with high pressure air from the air inlet 17 is enabled only if the detection device 1 is in its non-operative position, i.e. raised relative to its operative position in contact with the keg 2.

In addition, or alternatively to this high-pressure air washing, in a second specific embodiment of the method for detecting microleakages from kegs 2 and similar containers of the present invention, it is possible to provide a step of acquiring one or more measurements relating to said light emitted by said light source 12, still when said detection device 1 is in a non-operative position, i.e. when it is detached and raised from the keg.

In this case no absorption values at the specific wavelengths typical of $CO_2$ are acquired, but the level (intensity) of light that is received by the light sensor 13 is measured in order to determine if there has been opacification of the system light source/light sensor, due for example to residues of liquids or foam that have been deposited.

The measurement (or measurements) thus acquired is then compared with a third pre-set threshold value which is substantially representative of the degree of opacification of the system light source/light sensor which can be considered acceptable.

If one or more measurements relative to the light intensity detected in said non-operative position of the detection device 1 are higher than said third pre-set threshold value, it is conveniently provided a washing step with water and/or a washing liquid of said measuring chamber 11, and/or of said light source 12 and/or of said light sensor 13, controlled by a suitable valve placed on a water and/or a washing liquid inlet 18 in said measuring chamber 11. This water and/or washing liquid washing step can conveniently be followed by a high-pressure air washing step, as previously described, to dry the measuring chamber 11 and/or the system light source/light sensor.

Also in this case, the washing step with water and/or with a washing liquid from the inlet 18 of said measuring chamber 11, and/or of said light source 12 and/or of said light sensor 13 is enabled only if the detection device 1 is in its non-operative position, i.e. raised relative to its operative position in contact with the keg 2.

For the objectives of the present invention, the inlet of the washing fluids can take place directly in the detection head or through an equipment manually mounted or automatically connected to the detection head itself.

In practice it has been seen, as can be seen from the description and the accompanying figures, that the technical solutions adopted in the device and in the method for detecting microleakages from kegs and similar containers containing a liquid with $CO_2$ under pressure, according to the present invention, allow to entirely fulfill the prefixed tasks and objectives.

Based on the given description, other features, modifications or improvements are possible and obvious to the average technician. These features, modifications and improvements are therefore to be considered part of the present invention. In practice, the used materials, as well as the contingent shapes and dimensions, may be any according to the requirements and the state of the art.

The invention claimed is:

1. Device for detecting microleakages from kegs and similar containers containing a liquid with $CO_2$ under pressure and provided with an outlet mouth provided with a sealing valve, the device comprising a detection head adapted to seal and couple to said keg at said outlet mouth, said detection head comprising a measuring chamber adapted to face over said outlet mouth of said keg; a light source having an infrared component with wavelengths corresponding to $CO_2$ absorption wavelengths facing the measuring chamber; a light sensor facing said measuring chamber and detecting said infrared light component with wavelengths corresponding to the $CO_2$ absorption wavelengths emitted in said measuring chamber by said light source; at least a first air inlet into said measuring chamber and at least one air vent from said measuring chamber.

2. Device according to claim 1, further comprising a seal between said device and said keg when said device is in an operative position at said outlet mouth of said keg and a switch for moving said device between a non-operative position and an operative position coupled with sealing with said keg at said outlet mouth.

3. Device according to claim 1, wherein said first air inlet in said measuring chamber is a low pressure air inlet.

4. Device according to claim 1, further comprising a second air inlet in said measuring chamber, said first air inlet in said measuring chamber being a low pressure air inlet for air recirculation within said chamber, said second air inlet in said measuring chamber being a high pressure air inlet for washing said chamber.

5. Device according to claim 1, further comprising a water and/or a washing liquid inlet in said measuring chamber.

6. Device according to claim 1, further comprising a controller adapted to receive input signals from said light sensor representative of the amount of light with infrared component with wavelengths corresponding to the $CO_2$ absorption wavelengths absorbed during a microleakage detection cycle.

7. A method for detecting microleakages from kegs and similar containers containing a liquid with $CO_2$ under pressure and provided with an outlet mouth provided with a sealing valve, comprising the following steps:
   i) positioning said keg in a measuring position at a detection device according to claim 1, said detection device being in a non-operative position and spaced apart from said keg;
   ii) starting approach of said detection device to the outlet mouth of said keg from said non-operative position to an operative position sealingly coupled with said keg;
   iii) sealingly coupling said detection device in said operative position on said outlet mouth of said keg;
   iv) acquiring through said light sensor one or more measurements relative to said infrared light component having wavelengths corresponding to $CO_2$ absorption wavelengths emitted by light source;
   v) comparing said one or more measurements relative to said infrared light component having wavelengths corresponding to $CO_2$ absorption wavelengths with a first pre-set threshold value and determining whether said keg is subjected to microleakages based on said comparison;
   vi) removing said detection device from said keg by bringing said detection device from said operative position to said non-operative position;
   said comparison step v) being carried out before, during or after said step vi) of removing said detection device from said keg.

8. Method according to claim 7, wherein during said approaching step ii) of said detection device to the outlet mouth of said keg, said light sensor acquires at predetermined time intervals measurements of said infrared light component having wavelengths corresponding to $CO_2$ absorption wavelengths emitted by said light source.

9. Method according to claim 7, wherein during said approaching step ii) of said detection device to the outlet mouth of said keg air is recirculated in said measuring chamber entering from said first air inlet into said measuring chamber and leaving said measuring chamber from said at least one air vent.

10. Method according to claim 7, wherein the method comprises in said non-operative position of said detection device a step of acquiring one or more measurements of said infrared light component having wavelengths corresponding to $CO_2$ absorption wavelengths emitted by said light source and a comparison step of said measurements relating to said infrared light component with a second pre-set threshold value, and a washing step of said measuring chamber and said light sensor with high pressure air entering in said measuring chamber from a second air inlet if one or more measurements relating to said infrared light component with wavelengths corresponding to $CO_2$ absorption wavelengths in said non-operative position of said detection device is greater than said second pre-set threshold value and/or comprises a step of acquiring one or more measurements relative to said light emitted by said light source and a comparison step of said measurements relative to said light with a third pre-set threshold value, and a washing step with water and/or a washing liquid of said measuring chamber and/or said light source and/or said light sensor if one or more of said measurements relative to said light in said non-operative position of said detection device are greater than said third pre-set threshold value.

* * * * *